US011499087B2

(12) United States Patent
Jamison et al.

(10) Patent No.: US 11,499,087 B2
(45) Date of Patent: Nov. 15, 2022

(54) THERMALLY RESPONSIVE LOST CIRCULATION MATERIALS

(71) Applicant: Halliburton Energy Services, Inc., Houston, TX (US)

(72) Inventors: Dale E. Jamison, Humble, TX (US); William Walter Shumway, Spring, TX (US); Preston Andrew May, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 48 days.

(21) Appl. No.: 17/170,262

(22) Filed: Feb. 8, 2021

(65) Prior Publication Data
US 2021/0179915 A1 Jun. 17, 2021

Related U.S. Application Data

(62) Division of application No. 16/710,342, filed on Dec. 11, 2019, now Pat. No. 10,961,431.

(51) Int. Cl.
*E21B 33/138* (2006.01)
*C09K 8/50* (2006.01)
(Continued)

(52) U.S. Cl.
CPC .......... *C09K 8/5086* (2013.01); *C09K 8/501* (2013.01); *C09K 8/5083* (2013.01); *C09K 8/514* (2013.01); *E21B 21/003* (2013.01); *E21B 33/138* (2013.01)

(58) Field of Classification Search
CPC ...... C09K 8/5086; C09K 8/501; E21B 33/138
(Continued)

(56) References Cited

U.S. PATENT DOCUMENTS 6,316,011 B1 11/2001 Ron et al.
8,215,393 B2 11/2012 Mackay et al.
(Continued)

FOREIGN PATENT DOCUMENTS

JP H06206954 A 7/1994
WO 2001066600 A1 9/2001
(Continued)

OTHER PUBLICATIONS

International Search Report and Written Opinion issued in related PCT Application No. PCT/US2019/066163 dated Sep. 8, 2020, 10 pages.

*Primary Examiner* — Zakiya W Bates
*Assistant Examiner* — Ashish K Varma
(74) *Attorney, Agent, or Firm* — Tenley Krueger; C. Tumey Law Group PLLC

(57) ABSTRACT

Methods and compositions for the use of thermally responsive lost circulation materials in subterranean formations are provided. In one embodiment, the methods include introducing a treatment fluid including a base fluid and a thermally responsive lost circulation material including a thermally responsive hydrogel that includes at least one thermoresponsive polymer into a wellbore penetrating at least a portion of a subterranean formation including a loss zone; allowing the thermally responsive lost circulation material to reach a thickening transition temperature; and allowing the treatment fluid to at least partially set in the subterranean formation.

20 Claims, 4 Drawing Sheets

(51) Int. Cl.
*C09K 8/508* (2006.01)
*E21B 21/00* (2006.01)
*C09K 8/514* (2006.01)

(58) Field of Classification Search
USPC ........................................................ 166/292
See application file for complete search history.

(56) References Cited

U.S. PATENT DOCUMENTS

| | | | |
|---|---|---|---|
| 8,685,900 | B2 | 4/2014 | Ezell et al. |
| 9,157,306 | B2 * | 10/2015 | Miller ..................... C09K 8/64 |
| 9,267,257 | B2 * | 2/2016 | Zaitoun ..................... E02D 3/00 |
| 9,587,158 | B2 | 3/2017 | Livanec et al. |
| 9,598,927 | B2 | 3/2017 | Villarreal, Jr. et al. |
| 2004/0244978 | A1 * | 12/2004 | Shaarpour ................ C09K 8/80 166/293 |
| 2012/0264655 | A1 * | 10/2012 | Fitch ..................... C09K 8/508 507/119 |
| 2016/0220725 | A1 | 8/2016 | Whalen, III et al. |
| 2016/0369151 | A1 | 12/2016 | Livanec et al. |
| 2017/0335175 | A1 * | 11/2017 | Oliveira ................... C09K 8/74 |
| 2018/0360743 | A1 | 12/2018 | Bartynski et al. |
| 2019/0145223 | A1 | 5/2019 | Van Oort et al. |

FOREIGN PATENT DOCUMENTS

| | | |
|---|---|---|
| WO | 2012142235 A1 | 10/2012 |
| WO | 2015013306 A1 | 1/2015 |
| WO | 2018111222 A1 | 6/2018 |
| WO | 2018232384 A1 | 12/2018 |

\* cited by examiner

THERMALLY RESPONSIVE LOST CIRCULATION MATERIALS

CROSS-REFERENCE TO RELATED APPLICATIONS

This application claims priority to and is a divisional application of U.S. application Ser. No. 16/710,342 filed on Dec. 11, 2019, entitled "Thermally Responsive Lost Circulation Materials," and also claims priority to U.S. application Ser. No. 16/710,274 filed on Dec. 11, 2019, entitled "Thermally Responsive Viscosifiers in Subterranean Operations," and to U.S. application Ser. No. 16/710,399 filed on Dec. 11, 2019, entitled "Thermally Responsive Anti-Sag Agents," the entire disclosures of which are incorporated herein by reference.

BACKGROUND

The present disclosure relates to methods and compositions for use as lost circulation materials in subterranean formations.

Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, cementing fluids, gravel pack fluids, acidizing fluids, fracturing fluids, spacer fluids, and the like.

Treatment fluids used in servicing a wellbore may be lost to the subterranean formation while circulating in the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid may be more difficult to achieve.

In some drilling operations when lost circulation is observed, the wellbore may be treated with lost circulation materials for plugging the portion of formation through which the fluids are being lost. A variety of lost circulation materials have been used or proposed for arresting lost circulation of drilling fluids. However, in some instances, the lost circulation may be so severe that traditional lost circulation materials are not effective at arresting lost circulation. For example, in some cases, traditional lost circulation materials may not be sufficiently large to reduce or prevent lost circulation. Furthermore, most current techniques for using settable lost circulation materials involve materials that react quickly and therefore must be delivered downhole separately in a binary, dual-stream manner.

BRIEF DESCRIPTION OF THE DRAWINGS

These drawings illustrate certain aspects of some of the embodiments of the present disclosure and should not be used to limit or define the claims.

Figure 1A:
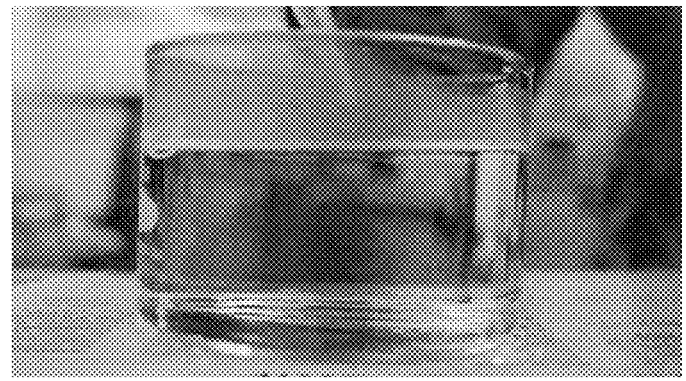
FIGS. 1A and 1B are photographs of an example of a thermally responsive hydrogel before and after injection into water at 37° C., in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

As used herein, the term "set" refers to the process of a liquid material transitioning to a harder or more solid material by curing. For example, in certain embodiments, a fluid may be considered "set" when the shear storage modulus is greater than the shear loss modulus of the fluid. In certain embodiments, a fluid may be considered "set" or at least partially set when it forms a gel.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

The present disclosure relates to methods and compositions for use as lost circulation materials in subterranean formations. More specifically, the present disclosure relates to methods and compositions for using thermally responsive lost circulation materials in subterranean formations. The methods of the present disclosure generally include: introducing a treatment fluid that includes a base fluid and a thermally responsive lost circulation material into a wellbore penetrating at least a portion of a subterranean formation including a loss zone; allowing the thermally responsive lost circulation material to reach a thickening transition temperature; and allowing the treatment fluid to at least partially set in the subterranean formation. In some embodiments, the thermally responsive lost circulation material may include a thermally responsive hydrogel. The present disclosure also provides a composition including at least one first lost circulation material, a second lost circulation material that includes a thermally responsive hydrogel including at least one thermoresponsive polymer, and a plurality of fibers. In certain embodiments, the at least one thermoresponsive polymer undergoes a thickening transition (which may be at least partially or entirely reversible) at about, or above, a thickening transition temperature.

Among the many advantages to the methods and compositions of the present disclosure, only some of which are alluded to herein, the methods and compositions of the present disclosure may, among other benefits, provide lost circulation materials for use in loss zones that are thermally responsive, tunable, and have a higher shear strength as compared to certain other lost circulation materials. In certain embodiments, the thermally responsive lost circulation materials of the present disclosure may provide an enhanced ability to plug a loss zone by undergoing a thermally-responsive thickening transition at high temperatures (e.g. at a temperature of the loss zone). In certain embodiments, the thermally responsive lost circulation materials of the present disclosure may provide an enhanced ability to plug a loss zone by existing as a fluid at low temperatures (e.g. a temperature at the surface) and solidifying at high temperatures (e.g. at a temperature of the loss zone). In certain embodiments, this may allow a single-component lost circulation material to undergo a phase change at the temperature of the loss zone and create a solid and/or semi-solid sealing material. In certain embodiments, the thermally responsive lost circulation materials of the present disclosure may be pumped downhole as a single stream through a drill pipe or other conduit, rather than pumping in separate streams of components that react to form a lost circulation material. In certain embodiments, this may simplify pumping the composition downhole and avoid issues related to separate streams mixing sufficiently and in the correct location in the subterranean formation.

In certain embodiments, the thermally responsive lost circulation materials of the present disclosure may be used in combination with other lost circulation materials, among other reasons, to improve their shear strength. In some embodiments, the thermally responsive lost circulation materials of the present disclosure may have tunable properties, including thickening transition temperature, set strength, density, viscosity, etc. For example, the composition of the thermally responsive lost circulation materials of the present disclosure may be tuned to provide a higher thickening transition temperature, which may facilitate more effective placement of the lost circulation material in a loss zone.

Without limiting the disclosure to any particular theory or mechanism, it is believed that the thermally responsive hydrogels included in the thermally responsive lost circulation materials of the present disclosure may include thermoresponsive polymers that exist, for example, in contracted, coiled states at lower temperatures where they may impart little viscosity to a fluid. In certain embodiments, upon an increase in temperature, the thermoresponsive polymers may un-coil or expand to a point of very high chain entanglement amongst different polymer chains, which may lead to an increase in viscosity of the fluid and/or cause the thermally responsive hydrogel to at least partially set. In some embodiments, this transition may initiate at a specific temperature and in some cases may occur relatively rapidly. In other embodiments, at lower temperatures it is believed that intramolecular forces within individual thermoresponsive polymers may dominate and lead to a collapsed structure. In certain embodiments, upon an increase in temperature, the thermal vibrational energy may increase to overcome the intramolecular forces within the individual thermoresponsive polymers and allow intermolecular attractive forces between polymer chains to occur. In turn, this may lead to an increase in viscosity and/or cause solid-state mechanical properties to develop (e.g. stiffness, toughness, and the like).

Treatment fluids typically contain additives to impart desired physical and/or chemical characteristics to the fluid. Lost circulation materials may prevent or lessen the loss of circulation fluids from a wellbore and may be settable materials delivered in a treatment fluid. The thermally responsive lost circulation materials of the present disclosure may be used in a variety of applications and environments in which plugging a loss zone may be important. Examples of applications suitable for certain embodiments of the present disclosure may include, but are not limited to use in subterranean formations, and/or downhole applications (e.g., drilling, fracturing, completions, oil production). In certain embodiments, thermally responsive lost circulation materials may be applicable to injection wells, monitoring wells, and/or production wells, including hydrocarbon or geothermal wells and wellbores. In other embodiments, the thermally responsive lost circulation materials may be introduced into a subterranean formation, for example, via a wellbore penetrating at least a portion of a subterranean formation. Addressing fluid loss that occurs during drilling or other downhole operations may be important for achieving the service of the fluid and/or mitigating or preventing severe to total lost circulation.

In certain embodiments, a treatment fluid including a base fluid and a thermally responsive lost circulation material including a thermally responsive hydrogel may be provided. Depending on the type of treatment to be performed, the treatment fluid may include any treatment fluid known in the art. Treatment fluids that may be useful in accordance with the present disclosure include, but are not limited to, drilling fluids, cement fluids, lost circulation fluids, stimulation fluids (e.g., a fracturing fluids or an acid stimulation fluids), completion fluids, conformance fluids (e.g., water or gas shutoff fluids), sand control fluids (e.g., formation or proppant consolidating fluids), workover fluids, and/or any combination thereof.

Figure 1B:
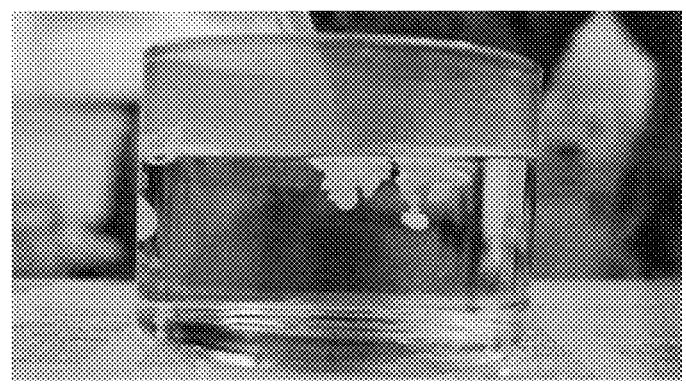

In certain embodiments, the thermally responsive hydrogel may be dispersed in an aqueous phase or a non-aqueous phase of the treatment fluid. In some embodiments, a thermally responsive hydrogel may include a material that is a highly absorbent, three-dimensional network of polymer chains. In some embodiments, the thermally responsive hydrogel may plug a loss zone at or above a thickening transition temperature. In some embodiments, the thermally responsive hydrogel may thicken a fluid as the temperature of the fluid increases by undergoing a thickening transition that is an at least partially reversible thickening transition. In certain embodiments, the thickening transition may correspond to a phase change of the thermally responsive hydrogel. In certain embodiments, the thickening transition may correspond to a phase change of the thermally responsive hydrogel that may be a liquid-to-solid phase change. In certain embodiments, the thermally responsive hydrogel may thicken a fluid as the temperature of the fluid increases without a chemical reaction occurring. In other embodiments, at lower temperatures (e.g. a temperature below the one or more thickening transition temperature ranges referenced below) the thermally responsive hydrogel may be part of a continuous phase of the treatment fluid. In some embodiments, the thermally responsive hydrogel may become a solid at high temperatures (e.g. at or above one of the thickening transition temperature ranges referenced below). FIGS. 1A and 1B are photographs depicting an embodiment of a thermally responsive hydrogel before (FIG. 1A) and after (FIG. 1B) injection into water at 37° C., demonstrating that the thermally responsive hydrogel may form a solid when the temperature of the hydrogel increases to a temperature above the thickening transition temperature.

Figure 2:
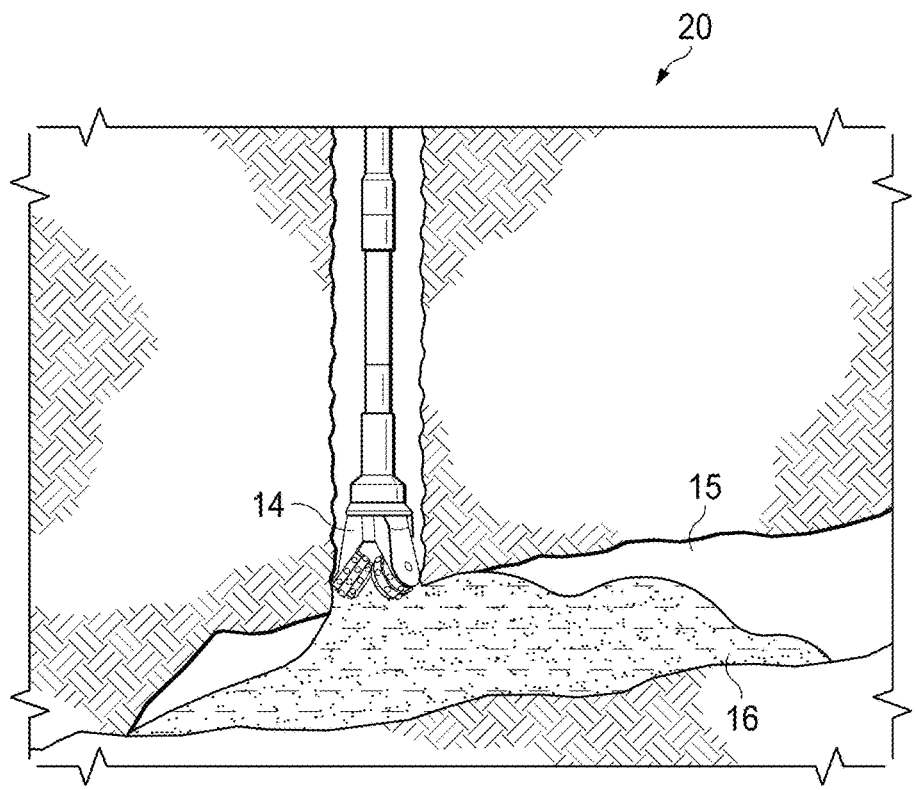
FIG. 2 is a schematic diagram of subterranean formation including a drill bit, a loss zone, and a treatment fluid, in accordance with certain embodiments of the present disclosure.

In certain embodiments, a treatment fluid including a thermally responsive lost circulation material including a thermally responsive hydrogel may be introduced into a location (e.g. into at least a portion of a subterranean formation). In certain embodiments, the treatment fluid including a thermally responsive lost circulation material may at least partially set (and, in some cases, may substantially or entirely set) at elevated temperatures, e.g. a temperature corresponding to a temperature in a loss zone. In certain embodiments, the treatment fluid including a thermally responsive lost circulation material may at least partially set almost instantaneously, e.g. within a few seconds. In certain embodiments, the treatment fluid including a thermally responsive lost circulation material may be pumped downhole and squeezed. In other embodiments, the treatment fluid including a thermally responsive lost circulation material may be simply pumped into a subterranean formation. In certain embodiments, the thermally responsive lost circulation material may at least partially set to very large particles and/or solids in a loss zone. In certain embodiments, the at least partially set thermally responsive lost circulation material may entirely fill a loss zone. In certain embodiments, the thermally responsive lost circulation material may be applied as a substantially full concentration spacer or pill. For example, with reference to FIG. 2, subterranean formation 20 may include drill bit 14. In certain embodiments, drill bit 14 may break into loss zone 15. In certain embodiments, the treatment fluids of the present disclosure 16 may be pumped into loss zone 15 to at least partially set with temperature.

In certain embodiments, additives or properties of the treatment fluid may impact one or more properties of the at least partially set thermally responsive lost circulation material. For example, in some embodiments, a gas-generating additive or a set of gas-generating reactants may be included in the treatment fluids of the present disclosure. Such additives may increase the amount of gas in the fluid, reducing the density of the at least partially set material. The strength of the at least partially set material may be increased in certain embodiments by, for example, increasing the polymer concentration in the treatment fluid, adding fibers to the fluid, and/or increasing the number of particles in the fluid.

In one or more embodiments, the treatment fluids before setting may have a density of from about 7 lbs/gal to about 20 lbs/gal, or more specifically from about 9 lbs/gal to about 15 lbs/gal, or more specifically from about 11 lbs/gal to about 13 lbs/gal.

The treatment fluids of the present disclosure may include any base fluid known in the art, including an aqueous fluid, a non-aqueous fluid, or any combination thereof. As used herein, the term "base fluid" refers to the major component of the fluid (as opposed to components dissolved and/or suspended therein), and does not indicate any particular condition or property of that fluid such as its mass, amount, pH, etc. Aqueous base fluids that may be suitable for use in the methods and compositions of the present disclosure may include water from any source. This may include fresh water, salt water (e.g., water containing one or more salts dissolved therein), brine (e.g., saturated salt water), seawater, or any combination thereof. The aqueous base fluid may be from a source that does not contain compounds that adversely affect other components of a fluid. In certain embodiments of the present disclosure, an aqueous base fluid may include one or more ionic species, such as those formed by salts dissolved in water. For example, seawater and/or produced water may include a variety of divalent cationic species dissolved therein. In certain embodiments, the density of the aqueous base fluid may be adjusted, among other purposes, to provide additional particulate transport and suspension in the treatment fluids of the present disclosure. In certain embodiments, the pH of the aqueous base fluid may be adjusted (e.g., by a buffer or other pH adjusting agent) to a specific level, which may depend on, among other factors, the types of thermally responsive hydrogels, and/or other additional additives included in a fluid. One of ordinary skill in the art, with the benefit of this disclosure, will recognize when such density and/or pH adjustments are appropriate.

Examples of a non-aqueous base fluid that may be suitable for use in the methods and compositions of the present disclosure include, but are not limited to a liquid hydrocarbon, an oil-water mixed production fluid, an organic liquid, a mineral oil, a synthetic oil, an ester, or any combination thereof. In certain embodiments, a non-aqueous base may include natural oil based muds (OBM), synthetic based muds (SBM), natural base oils, synthetic base oils and invert emulsions. In certain embodiments, the non-aqueous base fluid may include any petroleum oil, natural oil, synthetically derived oil, or combinations thereof. In some embodiments, OBMs and SBMs may include some non-oleaginous fluid such as water, making them water-in-oil type emulsions, also known as invert emulsions wherein a non-oleaginous fluid (e.g. water) includes the internal phase and an oleaginous fluid includes the external phase. The non-oleaginous fluid (e.g. water) may arise in the treatment fluid itself or from the wellbore, or it may be intentionally added to affect the properties of the treatment fluid. Any known non-aqueous fluid may be used to form the external oil phase of the invert emulsion fluid. In certain embodiments, the non-aqueous base fluid does not include a significant amount of water. In certain embodiments, the treatment fluids may include a mixture of one or more fluids and/or gases, including but not limited to emulsions, foams, and the like.

The thermally responsive hydrogels used in accordance with the methods and compositions of the present disclosure may include at least one thermoresponsive polymer. In certain embodiments, the thermoresponsive polymer may include at least one monomer that may include, but is not limited to, N-isopropylacrylamide, hydroxyethyl methacrylate, acrylamide, N,N-diethylacrylamide, N-tert-butylacrylamide, butyl acrylate, ethyl acrylate, propyl acrylate, methacrylamide, methacrylates, methyl vinyl ether, N-vinyl-caprolactam, polypeptides, ethylene oxide, propylene oxide, pluronic F-127, chitosan, any salt thereof, and/or any combination thereof.

In certain embodiments, the thermoresponsive polymer may be a copolymer. In other embodiments, the copolymer may include at least one first monomer and at least one second monomer, and the first monomer and the second monomer may be different monomers. In certain embodiments, the first monomer may be N-isopropylacrylamide. In certain embodiments, the second monomer may be N-tert-butylacrylamide. In certain embodiments, the second monomer may be butylacrylate. In other embodiments, the first monomer may be N-isopropylacrylamide and the second monomer may be N-tert-butylacrylamide. In certain embodiments, the first monomer may be N-isopropylacrylamide and the second monomer may be butylacrylate. In other embodiments, the thermoresponsive polymer may further include one or more other vinyl monomers. In some embodiments, including one or more vinyl monomers in the thermoresponsive polymer may reduce the cost and increase the salt tolerance of the thermally responsive hydrogel. In certain embodiments, the thermoresponsive polymer may further include one or more other suitable monomers as one of ordinary skill in the art will recognize with the benefit of this disclosure.

In certain embodiments, the thermally responsive hydrogel may include water and at least one thermoresponsive polymer that includes a poly(N-alkylacrylamide) copolymer, where alkyl may refer to a $C_{1-6}$ alkyl group. In other embodiments, the poly(N-alkylacrylamide) copolymer may include a first monomer that is an N-alkylacrylamide and a second monomer that may include, but is not limited to, N-alkylacrylamide, N-isopropylacrylamide, hydroxyethyl methacrylate, acrylamide, N,N-diethylacrylamide, N-tert-butylacrylamide, butyl acrylate, ethyl acrylate, propyl acrylate, methacrylamide, a methacrylate, methyl vinyl ether, N-vinyl-caprolactam, polypeptides, ethylene oxide, propylene oxide, pluronic F-127, chitosan, any salt thereof, and/or any combination thereof. Examples of an N-alkylacrylamide monomer include, but are not limited to, N-isopropylacrylamide, acrylamide, N-ethylacrylamide, N-methylacrylamide, N-n-butylacrylamide and N-tert-butylacrylamide.

In certain embodiments, the thermoresponsive polymer may further include an adhesion-enhancing additive. The adhesion-enhancing additive may include, but is not limited to, an Arg-Gly-Asp-Ser amino sequence (RGDS), one or more guanidine-containing compounds, manganese(II) chloride tetrahydrate, and any combination thereof. Examples of guanidine-containing compounds may include, but are not limited to, aganodine, agmatidine, agmatine, ambazone, amiloride, apraclonidine, aptiganel, argatroban, arginine, argininosuccinic acid, asymmetric dimethylarginine, benexate, benzamil, bethanidine, BIT225, blasticidin S, brostallicin, camostat, cariporide, chlorophenylbiguanide, cimetidine, ciraparantag, creatine, creatine ethyl ester, creatine methyl ester, creatinine, creatinolfosfate, 2-cyanoguanidine, cycloguanil, debrisoquine, dihydrostreptomycin, ditolylguanidine, E-64, ebrotidine, epinastine, eptifibatide, famotidine, glycocyamine, guanabenz, guanadrel, guanazodine, guanethidine, guanfacine, guanidine, guanidine nitrate, guanidinium chloride, guanidinium thiocyanate, 5'-guanidinonaltrindole, 6'-guanidinonaltrindole, guanidinopropionic acid, 3-guanidinopropionic acid, guanochlor, guanoxabenz, guanoxan, gusperimus, impromidine, kopexil, laninamivir, leonurine, lombricine, lugduname, metformin, methylarginine, mitoguazone, octopine, OUP-16, pentosidine, peramivir, phosphocreatine, picloxydine, pimagedine, polyhexamethylene guanidine, n-propyl-1-arginine, rimeporide, robenidine, saxitoxin, siguazodan, streptomycin, sucrononic acid, sulfaguanidine, synthalin, TAN-1057 A, TAN-1057 C, tegaserod, terbogrel, 1,1,3,3-tetramethylguanidine, tetrodotoxin, tomopenem, triazabicyclodecene, UR-AK49, vargulin, VUF-8430, zanamivir, and any combination thereof.

In certain embodiments, the thermoresponsive polymers of the present disclosure may include a first monomer and a second monomer at a ratio of from about 99:1 to about 50:50 by weight percentage ratio of first monomer:second monomer. In some embodiments, the thermoresponsive polymer may include a first monomer and a second monomer at a ratio of from about 99:1 to about 80:20 by weight percentage ratio of first monomer:second monomer. In some embodiments, the thermoresponsive polymer may include a first monomer and a second monomer at a ratio of from about 95:5 by weight percentage ratio of first monomer:second monomer. In some embodiments, the thermoresponsive polymer may include a first monomer that is N-isopropylacrylamide and a second monomer that is butylacrylate, and the first monomer and the second monomer may be present at a ratio of about 95:5 by weight percentage ratio of first monomer:second monomer.

The thermoresponsive polymer may include the monomers in any configuration and the monomers may be repeated with any frequency or pattern, or in a random nature. One of ordinary skill in the art, with the benefit of this disclosure, will recognize that, in certain embodiments, a thermoresponsive polymer suitable for use in accordance with the methods and compositions of the present disclosure may be provided in an acid form and/or in a salt form. In certain embodiments, the thermally responsive hydrogel may include a thermoresponsive polymer that is a block copolymer. In some embodiments, a block copolymer may include clusters of the same monomer that form blocks of a repeating unit.

In certain embodiments, the thermoresponsive polymer optionally may be at least partially crosslinked. As used herein, the term "crosslink" and grammatical derivatives thereof refers to a bond linking one monomer or polymer chain to another polymer chain. The bond may be any bond, for example, covalent bond, ionic bond, and the like. One of ordinary skill in the art, with the benefit of this disclosure, will recognize crosslinkers that are suitable for use in accordance with the methods and compositions of the present disclosure. As used herein, the term "crosslinker" refers to a compound, element, or ion used to crosslink and that includes two or more olefinic bonds. Examples of crosslinkers that are suitable for use with the thermoresponsive polymer of the present disclosure include, but are not limited to, pentaerythritol allyl ether and methylenebisacrylamide.

In certain embodiments, the thermally responsive hydrogels of the present disclosure may be a multipolymer interpenetrating polymeric hydrogel. In other embodiments, the multipolymer interpenetrating polymer hydrogel may include two independent crosslinked components. In certain embodiments, the crosslinked components may be synthetic and/or natural components, which may be contained in a network form. In some embodiments, the thermally responsive hydrogel may be a semi-interpenetrating polymer hydrogel. In certain embodiments, the semi-interpenetrating polymer hydrogel may include a cross-linked polymer component and a non-cross-linked polymer component. In certain embodiments, the thermally responsive hydrogel may include a thermoresponsive polymer that may include at least one monomer that is grafted onto a cheaper polymeric material (e.g. starch). This may provide the properties of the thermally responsive hydrogel at a reduced cost.

In certain embodiments, the treatment fluids of the present disclosure may exhibit a viscosity of from about 2 centipoise (cP) to about 250,000 cP (for example, as measured with a rotational viscometer or a Brookfield BF35 Viscometer (Ametek®, Inc. Corp., Pennsylvania)). In some embodiments, the treatment fluids of the present disclosure may exhibit a viscosity of from about 200 cP to about 250,000 cP. In some embodiments, the treatment fluids of the present disclosure may exhibit a viscosity of from about 1,000 cP to about 250,000 cP. In some embodiments, the treatment fluids of the present disclosure may exhibit a viscosity of from about 1,000 cP to about 20,000 cP. In some embodiments, the treatment fluids of the present disclosure may exhibit a viscosity of from about 2 cP to about 200 cP. In some embodiments, the treatment fluids of the present disclosure may exhibit a viscosity of from about 2 cP to about 25 cP. In certain embodiments, the composition of a treatment fluid including a thermally activated hydrogel may be altered to exhibit and/or maintain a certain viscosity at a certain temperature. In certain embodiments, this may involve altering the composition of a thermoresponsive polymer included in the thermally activated hydrogel to tune its thickening transition temperature.

The thermally responsive hydrogels of the present disclosure may include a thermoresponsive polymer that undergoes a thickening transition that results in an increase in viscosity of the treatment fluid to a viscosity of from about 25 cP to about 250,000 cP. In some embodiments, the thermally responsive hydrogels of the present disclosure may include a thermoresponsive polymer that undergoes a thickening transition that results in an increase in viscosity of the treatment fluid to a viscosity as low as any of 25, 50, 100, 200, 300, 400, and 500 cP. In certain embodiments, the thermally responsive hydrogels of the present disclosure may include a thermoresponsive polymer that undergoes a thickening transition that results in an increase in viscosity of the treatment fluid to a viscosity as high as any of 500, 1,000, 5,000, 10,000, 25,000, 50,000, 100,000, and 250,000 cP. In certain embodiments, the thermally responsive hydrogels of the present disclosure may include a thermoresponsive polymer that undergoes a thickening transition that results in an increase in viscosity of the treatment fluid to a viscosity of from about 25 cP to about 100,000 cP, in other embodiments, about 100 cP to about 50,000 cP, in other embodiments, about 500 cP to about 20,000 cP, in other embodiments, about 500 cP to about 10,000 cP, in other embodiments, about 200 cP to about 5,000 cP.

The thermally responsive hydrogels of the present disclosure may include a thermoresponsive polymer that undergoes a thickening transition at a thickening transition temperature of from about 30° C. (86° F.) to about 210° C. (410° F.). In certain embodiments, the thermally responsive hydrogel of the present disclosure may include a thermoresponsive polymer that undergoes a thickening transition at a thickening transition temperature as low as any of 30, 35, 40, 45, 50, 55, 60, 65, 70, 75, 80, 85, 90, 95, 100, 105, 110, 115, 120, 125, and 130° C. In certain embodiments, a thermally responsive hydrogel of the present disclosure may include a thermoresponsive polymer that undergoes a thickening transition at a thickening transition temperature as high as any of 130, 140, 150, 160, 170, 180, 190, 200 and 210° C. In certain embodiments, a treatment fluid including the thermally responsive hydrogel may be introduced into at least a portion of a subterranean formation wherein the thickening transition temperature at which a thermoresponsive polymer included in the thermally responsive hydrogel undergoes a thickening transition is from about 30° C. (86° F.) to about 210° C. (410° F.), in other embodiments, about 50° C. (122° F.) to about 210° C. (410° F.), in other embodiments, about 75° C. (167° F.) to about 210° C. (410° F.), in other embodiments, about 100° C. (212° F.) to about 210° C. (410° F.), in other embodiments, about 125° C. (257° F.) to about 210° C. (410° F.), in other embodiments, about 125° C. (257° F.) to about 190° C. (374° F.), in other embodiments, about 125° C. (257° F.) to about 170° C. (338° F.), in other embodiments, about 125° C. (257° F.) to about 150° C. (302° F.). In certain embodiments, the thickening transition may include a liquid-to-solid phase change that occurs at about or above the thickening transition temperature. In certain embodiments, the thickening transition may be at least partially reversible, e.g. a solid thermally responsive hydrogel may become at least partially a liquid thermally responsive hydrogel as the temperature of the thermally responsive hydrogel is decreased to a temperature below the thickening transition temperature.

In some embodiments, the composition of the thermoresponsive polymers of the present disclosure may be altered to tune the thickening transition temperature. In certain embodiments, the composition of the thermoresponsive polymer may be altered to tune the thickening transition temperature at which a liquid-to-solid phase change occurs. In certain embodiments, the composition of the thermoresponsive polymer may be altered, for example, by changing the polymer composition, changing the polymer configuration, use of crosslinkers, addition of additives, and the like.

The thermally responsive hydrogel of the present disclosure may include a plurality of thermoresponsive polymers. In certain embodiments, the plurality of thermoresponsive polymers may have a plurality of thickening transition temperature. In some embodiments, the thermally responsive hydrogel may include two, three, four, five, six, seven, eight, nine, or ten different thermoresponsive polymers. In other embodiments, the thermally responsive hydrogel may include more than ten thermoresponsive polymers. In certain embodiments, the inclusion of a plurality of thermoresponsive polymers in the thermally responsive hydrogel may provide a more gradual liquid-to-solid phase change and/or increase in viscosity with increasing temperature of the treatment fluid or the fluid in which the thermally responsive hydrogel is present.

The thermally responsive lost circulation material including a thermally responsive hydrogel used in accordance with the methods and compositions of the present disclosure should be present in a fluid in an amount sufficient to plug a loss zone at or above a thickening transition temperature. In certain embodiments, the thermally responsive lost circulation material may be present in the fluid in an amount from about 3% to about 60% by weight of the fluid. In certain embodiments, the thermally responsive lost circulation material may be present in the fluid in an amount from about 5% to about 40% by weight of the fluid. In certain embodiments, the thermally responsive lost circulation material may be present in the fluid in an amount from about 8% to about 35% by weight of the fluid. In certain embodiments, the thermally responsive lost circulation material may be present in the fluid in an amount from about 25% to about 60% by weight of the fluid. In certain embodiments, the thermally responsive lost circulation material may be present in the fluid in an amount of about 60% by weight of the fluid. In some embodiments, the thermally responsive lost circulation material may be present in the fluid in an amount from about 3% to about 10%, in other embodiments, from about 10% to about 20%, in other embodiments, from about 20% to about 30%, in other embodiments, from about 30% to about 40%, in other embodiments, from about 40% to about 50%, and in other embodiments, from about 50% to about 60% by weight of the fluid.

In certain embodiments, the thermally responsive hydrogel may form a solid thermally responsive hydrogel at about, or above, a thickening transition temperature (e.g. at or above one or more of the thickening transition temperature ranges referenced above). In certain embodiments, the solid thermally responsive hydrogel may be present in a fluid at about, or above, a thickening transition temperature in an amount from about 0.01 to about 1 by volume fraction of solids of the fluid. In certain embodiments, the solid thermally responsive hydrogel may be present in the fluid at about, or above, a thickening transition temperature in amount from about 0.2 to about 0.8 by volume fraction of solids of the fluid. In certain embodiments, the solid thermally responsive hydrogel may be present in the fluid at about, or above, a thickening transition temperature in amount from about 0.04 to about 0.5 by volume fraction of solids of the fluid. In certain embodiments, the solid thermally responsive hydrogel may be present in the fluid in amount from about 0.01 to about 0.2, in other embodiments, from about 0.2 to about 0.4, in other embodiments, from about 0.4 to about 0.6, in other embodiments, from about 0.6 to about 0.8, in other embodiments, from about 0.8 to about 1.0 by volume fraction of solids of the fluid.

In certain embodiments, the treatment fluids of the present disclosure optionally may include any number of additional additives. Examples of such additional additives include, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

In some embodiments, the treatment fluids of the present disclosure may optionally include a weighting agent. In some embodiments, the weighting agent may be added to produce a desired density in the treatment fluid. Examples of suitable weighting agents include, but are not limited to barite, hematite, calcium carbonate, magnesium carbonate, iron carbonate, zinc carbonate, manganese tetraoxide, ilmenite, NaCl, KCl, formate salts, and the like, and any combination thereof. These weighting agents may be at least partially soluble or insoluble in the treatment fluid. In one or more embodiments, a weighting agent may be present in the treatment fluids in an amount of from about 0.1% to about 60% by weight of the treatment fluid (e.g., about 5%, about 10%, about 15%, about 20%, about 25%, about 30%, about 35%, about 40%, about 45%, about 50%, about 55%, etc., all by weight of the treatment fluid). In other embodiments, the weighting agents may be present in the treatment fluids in an amount of from about 1% to about 35% by weight of the treatment fluid. In some embodiments, the weighting agent may be present in the treatment fluids in an amount of from about 0.1% to about 1% by weight of the treatment fluid (e.g., no more than 1%, 0.9%, 0.8%, 0.7%, 0.6%, or 0.5%, all by weight of the treatment fluid). A person skilled in the art, with the benefit of this disclosure, will recognize the types of weighting agent that may be included in the fluids of the present disclosure for a particular application.

In certain embodiments, the treatment fluids of the present disclosure may include a density-reducing additive. Examples of density reducing additives suitable for certain embodiments of the present disclosure include, but are not limited to gas, suspension acids, defoamers, hollow glass beads, pozzolanic microspheres, solid beads (e.g., solid organic or plastic beads), or any combination thereof.

In some embodiments, the treatment fluids of the present disclosure may include one or more polymeric fluid loss control additives. Examples of suitable polymeric fluid loss control additives include FILTER-CHEK™ fluid (i.e., carboxymethyl starch), N-DRIL™ HT PLUS fluid (i.e., a crosslinked corn starch), PAC™-L fluid (i.e., polyanionic cellulose), all of which are commercially available from Halliburton Energy Services, Inc., and any combination thereof.

In certain embodiments, the treatment fluid does not include a significant amount (e.g., no more than 0.5%, 0.4%, 0.3%, 0.2%, 0.1%, or 0.01%, all by weight of the treatment fluid) of a bridging agent. In some embodiments, the treatment fluid is free or substantially free of particulates other than the thermally responsive hydrogel. In certain embodiments, the treatment fluids of the present disclosure may include additional lost circulation materials or bridging agents. In some embodiments, additional lost circulation materials may be included in the compositions as a secondary mechanism to reduce fluid loss without altering the thixotropic behavior of the treatment fluid. In certain embodiments, lost circulation materials may include, but are not limited to STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); and the like; and any combination thereof.

In certain embodiments, lost circulation materials may include a plurality of fibers. Examples of synthetic fibers suitable for certain embodiments of the present disclosure include, but are not limited to, polymers or copolymers composed of polypropylene, polyaramid, polyester, polyacrylonitrile, and polyvinyl alcohol. Examples of biodegradable fibers include, but are not limited to, fibers composed of modified cellulose, chitosan, soya, modified chitosan, polycaprolactone, polylactic acid, poly (3-hydroxybutyrate), polyhydroxy-alkanoates, polyglycolic acid "PGA", polylactic acid "PLA", polyorthoesters, polycarbonates, polyaspartic acid, polyphosphoesters, soya, or copolymers thereof. Examples of natural fibers suitable for certain embodiments of the present disclosure include, but are not limited to fibers of cellulose including viscose cellulosic fibers, oil coated cellulosic fibers, and fibers derived from a plant product like paper fibers. Examples of other suitable fibers include, but are not limited to carbon including carbon fibers; meltprocessed inorganic fibers including basalt fibers, wollastonite fibers, non-amorphous metallic fibers, ceramic fibers, glass fibers, and other mineral fibers. The fibers may also be a composite fiber made from any combination of the preceding materials. A commercially-available example of suitable fibers is BAROLIFT®, sweeping agent, marketed by Halliburton Energy Services, Inc., which is a synthetic fiber. In certain embodiments, the fibers may have a length to diameter aspect ratio of from about 2:1 to about 5,000:1.

Figure 3:
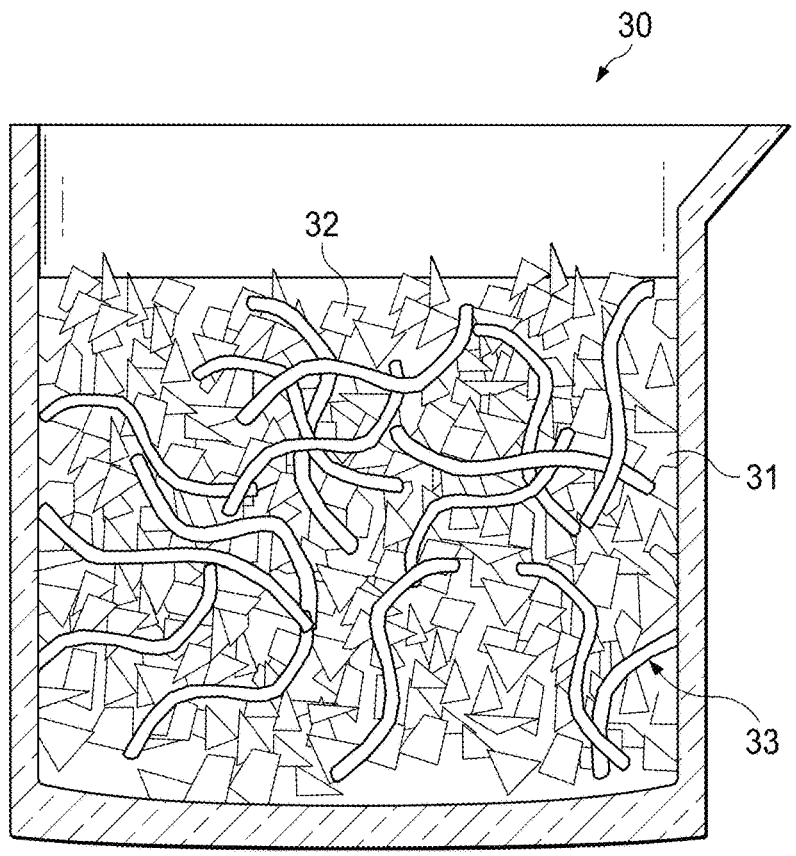
FIG. 3 is a schematic diagram of a composite mixture of a thermally responsive lost circulation material including a thermally responsive hydrogel, at least one additional lost circulation material, and a plurality of fibers, in accordance with certain embodiments of the present disclosure.

As depicted in FIG. 3, a thermally responsive lost circulation material 30 may include a thermally responsive hydrogel 31, at least one additional lost circulation material 32, and a plurality of fibers 33. In certain embodiments, thermally responsive lost circulation material 30 may be a fluid at low temperatures (e.g. a temperature at the surface). In other embodiments, thermally responsive lost circulation material 30 may solidify to a tough and resilient solid material at high temperatures (e.g. at a temperature of the loss zone). Additional lost circulation material 32 may include any one of the lost circulation materials referenced above, or any other suitable lost circulation material. Fibers 33 may include anyone of the fibers referenced above or any other fibrous material. In certain embodiments, the thermally responsive hydrogel may be present in the thermally responsive lost circulation material in an amount of from about 50% to about 99.9% by weight of the thermally responsive lost circulation material (e.g., about 50%, about 55%, about 60%, about 65%, about 70%, about 75%, about 80%, about 85%, about 90%, about 95%, about 99.9%, etc., all by weight of the thermally responsive lost circulation material). In other embodiments, the at least one additional lost circulation material may be present in the thermally responsive lost circulation material in an amount of from about 0.1% to about 50% by weight of the thermally responsive lost circulation material (e.g., about 5%, about 10%, about 15%, about 20%, about 25%, about 30%, about 35%, about 40%, about 45%, about 50%, etc., all by weight of the thermally responsive lost circulation material). In certain embodiments, the fibers may be present in the thermally responsive lost circulation material in an amount of from about 0.1% to about 50% by weight of the thermally responsive lost circulation material (e.g., about 5%, about 10%, about 15%, about 20%, about 25%, about 30%, about 35%, about 40%, about 45%, about 50%, etc., all by weight of the thermally responsive lost circulation material). In some embodiments, thermally responsive lost circulation material 30 may include thermally responsive hydrogel 31 in an amount of about 50%, additional lost circulation material 32 in an amount of about 40%, and fibers 33 in an amount of about 10%.

In certain embodiments, the treatment fluids including a thermally responsive lost circulation material optionally may include one or more surfactants. The surfactant may, among other purposes, help disperse the thermally responsive lost circulation material and/or other additives in a treatment fluid. Examples of surfactants that may be suitable for use may include, but are not limited to, an alkoxylated alkyl alcohol and salts thereof, an alkoxylated alkyl phenol and salts thereof, an alkyl or aryl sulfonate, a sulfate, a phosphate, a carboxylate, a polyoxyalkyl glycol, a fatty alcohol, a polyoxyethylene glycol sorbitan alkyl ester, a sorbitan alkyl ester, a polysorbate, a glucoside, a quaternary amine compound, an amine oxide surfactant, or any combination thereof.

The treatment fluids of the present disclosure may be prepared using any suitable method and/or equipment (e.g., blenders, mixers, stirrers, etc.) known in the art at any time prior to their use. The treatment fluids may be prepared at a well site or at an offsite location.

In some embodiments, the methods of the present disclosure may include introducing at least a portion of the treatment fluids into a loss zone or other flowpath and causing or allowing the treatment fluid to at least partially set (e.g., form a solid, semi-solid, gel, plug, etc.). In some embodiments, the treatment fluids may be introduced into the wellbore to prevent the loss of aqueous or non-aqueous fluids into loss zones such as voids, vugular zones, perforations, and natural or induced fractures. In certain embodiments, the treatment fluids may form a non-flowing, intact mass inside the loss zone which plugs the zone and inhibits loss of subsequently pumped drilling fluid, which allows for further drilling. For example, in certain embodiments, the treatment fluid may function as a plug that is placed into an annulus of the wellbore and prepares the formation for placement of a second (e.g., cementitious) composition. In certain embodiments, the treatment fluid may be introduced into the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof. In some embodiments, one or more treatment fluids may at least partially plug a loss zone. In certain embodiments, a treatment fluid including a thermally responsive lost circulation material of the present disclosure may set and at least partially plug a loss zone.

In some embodiments, the methods of the present disclosure may include foaming the treatment fluid by incorporating air, nitrogen, an appropriate foamer, glass spheres, or any combination thereof into the fluid. In some embodiments, the methods of the present disclosure may include foaming the thermally responsive lost circulation materials by incorporating air, nitrogen, an appropriate foamer, glass spheres, or any combination thereof into the fluid. In certain embodiments, foaming the treatment fluid may increase the volume of the treatment fluid or thermally responsive lost circulation materials to allow the plugging of a larger loss zone. In other embodiments, foaming the treatment fluid may reduce the cost of the treatment fluid or thermally responsive lost circulation materials. In certain embodiments, foaming the treatment fluid may introduce air bubbles that may lower the thermal conductivity of the treatment fluid and reduce the setting speed of the thermally responsive lost circulation materials.

In other embodiments, the thermally responsive lost circulation materials of the present disclosure may be added to cements. In certain embodiments, this may increase the speed of initial compressive-strength development at high temperatures. In certain embodiments, the thermally responsive lost circulation material may set while the cement phase continues to cure. In some embodiments, this may reduce premature curing or setting of the cement. In other embodiments, this may increase the compressive strength of the resulting material. In certain embodiments, this may result in a lower density cement with a compressive strength comparable to that of a high density cement lacking the thermally responsive lost circulation material.

In some embodiments, the treatment fluid or thermally responsive lost circulation materials of the present disclosure may be removed from the subterranean formation and/or the loss zone. In some embodiments, removal of the thermally responsive lost circulation materials may be facilitated by a thickening transition of a thermally responsive hydrogel included in the thermally responsive lost circulation materials that may be at least partially reversible. For example, a solid thermally responsive hydrogel may become at least partially a liquid thermally responsive hydrogel as the temperature of the thermally responsive hydrogel is decreased to a temperature below a thickening transition temperature. In certain embodiments, a chilled fluid may be pumped downhole to re-liquefy the at least partially set treatment fluid or thermally responsive lost circulation material. In certain embodiments, this may re-open closed fractures or a diverter area. In other embodiments, the at least partially set treatment fluid or thermally responsive lost circulation materials may be removed from the loss zone by flowing back the well. In some embodiments, the treatment fluid or thermally responsive lost circulation materials of the present disclosure may be degraded or dissolved. Such degradation or dissolution may occur over time, in response to contacting the treatment fluid or thermally responsive lost circulation materials with an acidic fluid, or in response to one or more downhole conditions (e.g., a decrease in temperature).

In certain embodiments, a treatment fluid including a thermally responsive lost circulation materials may be chilled before being introduced into a location (e.g. a subterranean formation). In other embodiments, only the thermally responsive lost circulation materials in the fluid may be chilled before being introduced into a location (e.g. a subterranean formation). In certain embodiments, the thermal load on the thermally responsive lost circulation materials after they have been introduced may be simulated. In certain embodiments, this may allow for the management of the treatment fluid such that it may be pumped to a specific location before the thermally responsive lost circulation material at least partially sets or solidifies. In certain embodiments, the solidification of the thermally responsive lost circulation material may be at least partially reversible, e.g. a solid thermally responsive lost circulation material may become at least partially a liquid thermally responsive lost circulation material as the temperature of the thermally responsive lost circulation material is decreased to a temperature below a thickening transition temperature. In certain embodiments, a bottom hole temperature may be high (e.g. one or more of the temperatures referenced below) and the treatment fluid may be chilled to a temperature much lower than ambient (e.g. to a temperature below 10° C.). In other embodiments, a freezing point inhibitor (e.g. ethylene glycol, polyethylene glycol and/or a salt) may be included and the treatment fluid may be chilled to a temperature at about or below 0° C.

In certain embodiments, the treatment fluids of the present disclosure may be suitable for use at a variety of temperatures, pH levels, water salinities, and mineralogies of subterranean formations. In some embodiments, the materials that make up the treatment fluids may at least partially set and/or be stable at high temperatures. In certain embodiments, the materials that make up the treatment fluids may function at temperatures above 32° C. (90° F.) and above 127° C. (260° F.). Thus, in certain embodiments, the treatment fluids and methods of the present disclosure may provide effective loss zone treatment, plug formation, and other wellbore treatment, even when used in conditions at or above 127° C. (260° F.). Additionally, the treatment fluids of the present disclosure may be suitable for a variety of subterranean formations, including, but not limited to shale formations and carbonate formations. In certain embodiments, the subterranean formation may have a bottom hole temperature of from about 66° C. (150° F.) to about 204° C. (400° F.). In certain embodiments, the subterranean formation may have a bottom hole temperature of at least 177° C. (350° F.).

The methods and compositions of the present disclosure may be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates a subterranean formation. In certain embodiments, a wellbore may be drilled and the treatment fluid may be circulated in the wellbore during, before, or after the drilling. In some embodiments, the treatment fluid may be introduced into a subterranean formation via a single flow path (e.g., drill pipe, annulus, etc.). Introduction of the treatment fluids of the present disclosure may in certain embodiments include delivery via any of a tube, umbilical, pump, gravity, and combinations thereof. The treatment fluids of the present disclosure may, in various embodiments, be delivered downhole (e.g., into the wellbore) or into top-side flowlines/pipelines or surface treating equipment. For example, in certain embodiments, the treatment fluids of the present disclosure may be applied to a subterranean formation and/or wellbore using batch treatments, squeeze treatments, continuous treatments, and/or combinations thereof.

In some embodiments, the treatment fluids of the present disclosure may carry out a variety of subterranean treatments, including but not limited to, preflush treatments, afterflush treatments, hydraulic fracturing treatments, acidizing treatments, sand control treatments (e.g., gravel packing), "frac-pack" treatments, wellbore clean-out treatments, drilling operations, and other operations where a treatment fluid may be useful. Such treatment fluids may include, but are not limited to, drilling fluids, preflush fluids, afterflush fluids, fracturing fluids, acidizing fluids, gravel packing fluids, packer fluids, spacer fluids, and the like.

The treatment fluids disclosed herein may directly or indirectly affect one or more components or pieces of equipment associated with the preparation, delivery, recapture, recycling, reuse, and/or disposal of the treatment fluids of the present disclosure. For example, the methods and compositions of the present disclosure may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of treatment fluids, and any sensors (i.e., pressure and temperature), gauges, and/or combinations thereof, and the like. The treatment fluids of the present disclosure may also directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), wiper balls, wiper darts, pigs, logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps.

Figure 4:
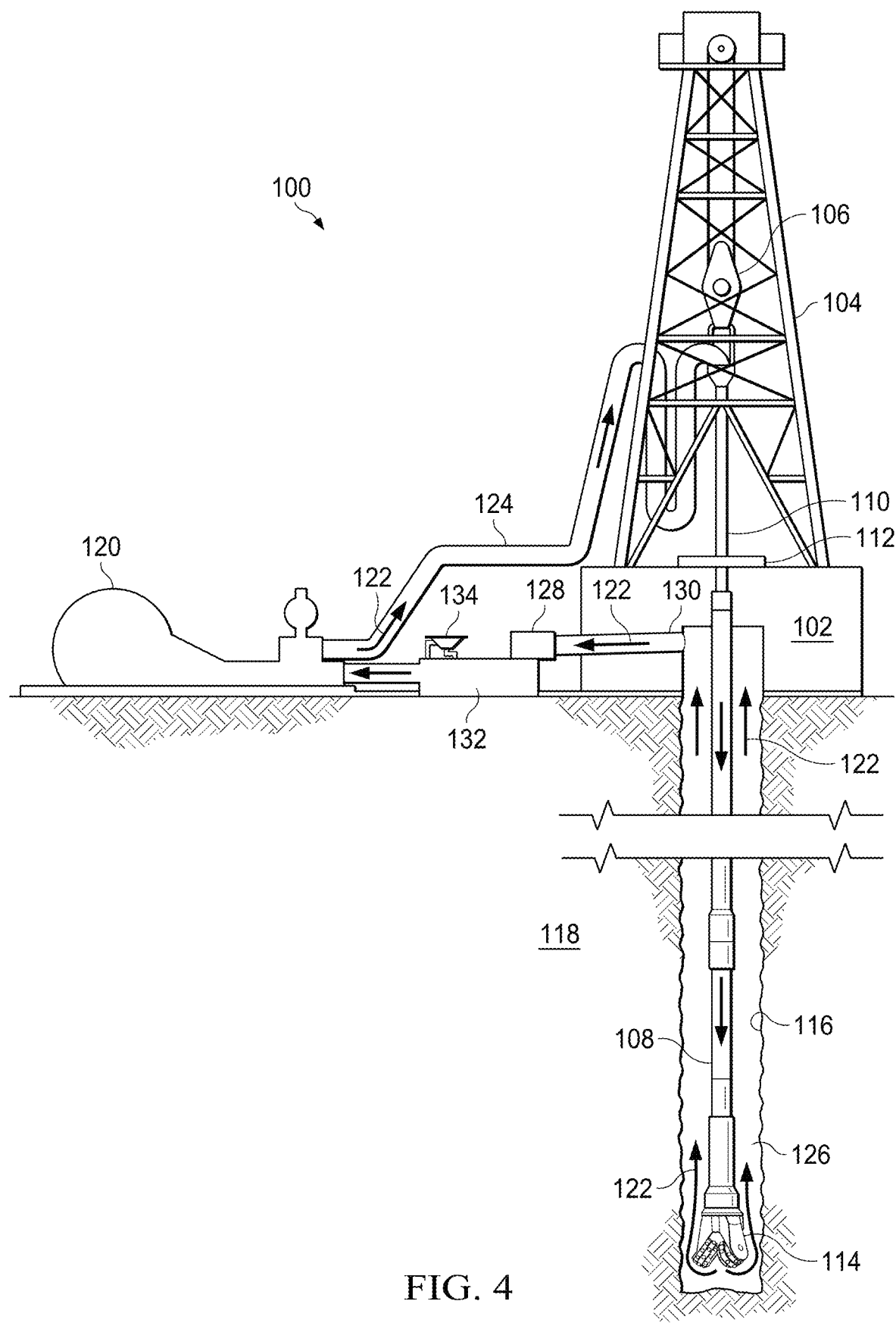
FIG. 4 is a schematic diagram of a system that may deliver lost circulation materials of the present disclosure to a downhole location in accordance with certain embodiments of the present disclosure.

For example, and with reference to FIG. 4, the treatment fluids of the present disclosure may directly or indirectly affect one or more components or pieces of equipment associated with an exemplary wellbore drilling assembly 100, according to one or more embodiments. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates wellbore fluid 122 (e.g., a drilling fluid or a lost circulation pill described herein) through a feed pipe 124 and to the kelly 110, which conveys the wellbore fluid 122 downhole through the interior of the drill string 108 and through one or more orifices in the drill bit 114 (or optionally through a bypass or ports (not shown) along the drill string and above the drill bit 114). The wellbore fluid 122 is then circulated back to the surface via an annulus 126 defined between the drill string 108 and the walls of the borehole 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed treatment fluids may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the treatment fluids of the present disclosure may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the treatment fluids of the present disclosure may be stored, reconditioned, and/or regulated until added to the wellbore fluid 122.

As mentioned above, the treatment fluids of the present disclosure may directly or indirectly affect the components and equipment of the drilling assembly 100. For example, the treatment fluids of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary treatment fluids.

The treatment fluids of the present disclosure may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The treatment fluids of the present disclosure may also directly or indirectly affect the mixing hopper 134 and the retention pit 132 and their assorted variations.

The treatment fluids of the present disclosure may also directly or indirectly affect the various downhole equipment and tools that may come into contact with the treatment fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The treatment fluids of the present disclosure may also directly or indirectly affect any downhole heat exchangers, valves and corresponding actuation devices, tool seals, packers and other wellbore isolation devices or components, and the like associated with the wellbore 116. The treatment fluids of the present disclosure may also directly or indirectly affect the drill bit 114, which may include, but is not limited to, roller cone bits, PDC bits, natural diamond bits, any hole openers, reamers, coring bits, etc.

Figure 5:
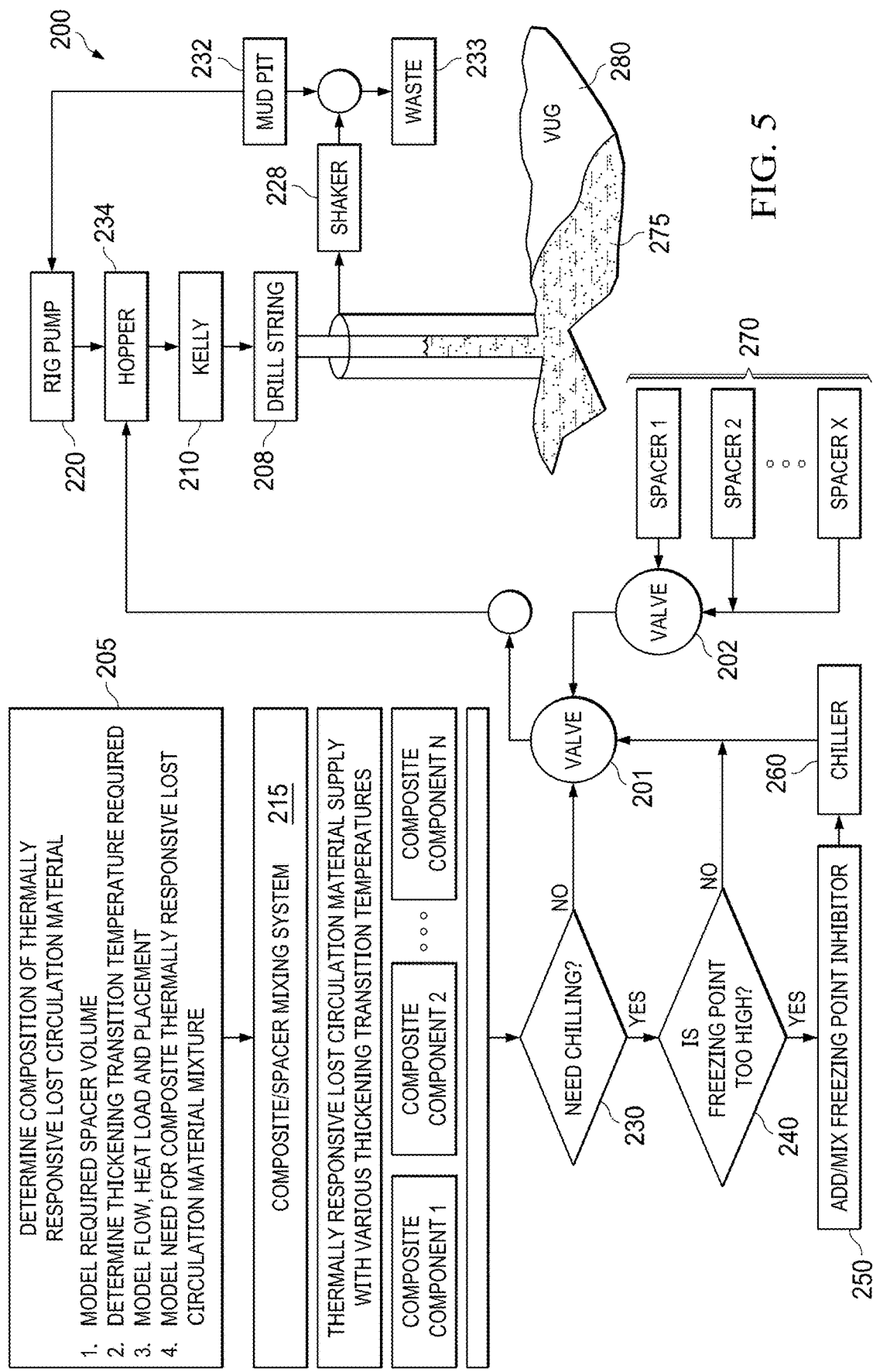
FIG. 5 is a diagram illustrating a process flow for treating a wellbore with a treatment fluid including a thermally responsive lost circulation material in accordance with certain embodiments of the present disclosure.

FIG. 5 depicts a process flow 200 for certain embodiments of treating a wellbore with a treatment fluid that includes a thermally responsive lost circulation material. In certain embodiments, the method 200 includes determining a composition for the treatment fluid that includes the thermally responsive lost circulation material 205. In certain embodiments, this may include modeling a spacer volume, determining the necessary thickening transition temperature of the treatment fluid, modeling the flow, heat load, and placement of the treatment fluid, and modeling the need for the treatment fluid to include a composite thermally responsive lost circulation material mixture. In certain embodiments, the method 200 may include injecting a spacer before and/or after the treatment fluid. In certain embodiments, process flow 200 may also include mixing the treatment fluid including the thermally responsive lost circulation material in composite/spacer mixing system 215, which may include introducing an amount of a thermally responsive lost circulation material spacer supply with various thickening transition temperatures to the treatment fluid, and introducing at least one of composite components 1-n to the treatment fluid. In certain embodiments, process flow 200 may include determining if the treatment fluid should be chilled 230, based at least in part on the flow, the heat load and the placement of the treatment fluid. In other embodiments process flow 200 may include determining if a freezing point of the treatment fluid is too high 240, based at least in part on the flow, the heat load and the placement of the treatment fluid. If the freezing point of the treatment fluid is too high, freezing point inhibitor may be added in step 250 to the treatment fluid. In certain embodiments, process flow 200 may include chilling of the treatment fluid in chiller 260. In other embodiments, process flow 200 may include injecting at least one of spacers 1-x 270 before or after the treatment fluid into a wellbore. In other embodiments, spacers 1-x 270 may be different compositions, for example, an oil, brine, or water pill. One of ordinary skill in the art, with the benefit of this disclosure, will recognize the spacer compositions that are appropriate. Process flow 200 may also include the flow of treatment fluid through one or more valves 201 and 202, rig pump 220, hopper 234, kelly 210, drill string 208, shaker 228, mud pit 232, and waste 233. In certain embodiments, the method 200 may include introducing a treatment fluid that includes a base fluid and a thermally responsive lost circulation material 275 including a thermally responsive hydrogel that includes at least one thermoresponsive polymer into a wellbore penetrating at least a portion of a subterranean formation including a loss zone 280; allowing the thermally responsive lost circulation material to reach a thickening transition temperature, and allowing the treatment fluid to at least partially set.

An embodiment of the present disclosure is a method including introducing a treatment fluid that includes a base fluid and a thermally responsive lost circulation material including a thermally responsive hydrogel that includes at least one thermoresponsive polymer into a wellbore penetrating at least a portion of a subterranean formation including a loss zone; allowing the thermally responsive lost circulation material to reach a thickening transition temperature; and allowing the treatment fluid to at least partially set in the subterranean formation.

Another embodiment of the present disclosure is a composition including at least one first lost circulation material, a second lost circulation material that includes a thermally responsive hydrogel including at least one thermoresponsive polymer, and a plurality of fibers.

Another embodiment of the present disclosure is a method including determining a composition for a treatment fluid including a thermally responsive lost circulation material based at least in part on: a spacer volume; a thickening transition temperature of the treatment fluid; a flow, a heat load and a placement of the treatment fluid; and a need for the treatment fluid to include a composite thermally responsive lost circulation material mixture; mixing the treatment fluid in a composite/spacer mixing system; determining if the treatment fluid should be chilled based at least in part on the flow, the heat load and the placement of the treatment fluid; if the treatment fluid should be chilled, chilling the treatment fluid to a temperature below an ambient temperature of the composite/spacer system; determining if a freezing point of the treatment fluid is too high based at least in part on the flow, the heat load and the placement of the treatment fluid; if the freezing point of the treatment fluid is too high, adding a freezing point inhibitor to the treatment fluid; injecting at least one spacer before or after the treatment fluid into a wellbore penetrating at least a portion of a subterranean formation including a loss zone; and introducing the treatment fluid into the wellbore.

Another embodiment of the present disclosure is a method including introducing a treatment fluid that includes a base fluid and a thermally responsive lost circulation material including a thermally responsive hydrogel that includes at least one thermoresponsive polymer into a wellbore penetrating at least a portion of a subterranean formation including a loss zone; allowing the thermally responsive lost circulation material to reach a thickening transition temperature; and allowing the treatment fluid to at least partially set in the subterranean formation, wherein the at least partially set treatment fluid at least partially plugs the loss zone. Optionally in this embodiment or any other embodiment disclosed herein, the base fluid includes at least one component selected from the group consisting of: water, salt water, brine, seawater, a gas, a liquid hydrocarbon, an oil-water mixed production fluid, a natural oil based mud, a synthetic based mud, a natural base oil, a synthetic base oil, an invert emulsion, and any combination thereof. Optionally in this embodiment or any other embodiment of the present disclosure, the thermally responsive lost circulation material is present in the treatment fluid in an amount from about 3% to about 60% by weight of the treatment fluid. Optionally in this embodiment or any other embodiment of the present disclosure, the treatment fluid further includes a freezing point inhibitor. Optionally in this embodiment or any other embodiment of the present disclosure, the method further includes chilling the treatment fluid prior to introducing the treatment fluid into the wellbore. Optionally in this embodiment or any other embodiment of the present disclosure, the thermally responsive hydrogel includes a hydrogel selected from the group consisting of: a multipolymer interpenetrating polymeric hydrogel, a semi-interpenetrating polymer hydrogel, and any combination thereof. Optionally in this embodiment or any other embodiment of the present disclosure, the at least one thermoresponsive polymer includes at least one monomer selected from the group consisting of: N-isopropylacrylamide, hydroxyethyl methacrylate, acrylamide, N,N-diethylacrylamide, N-ethylacrylamide, N-methylacrylamide, N-n-butylacrylamide, N-tert-butylacrylamide, butyl acrylate, ethyl acrylate, propyl acrylate, methacrylamide, a methacrylate, methyl vinyl ether, N-vinyl-caprolactam, polypeptides, ethylene oxide, propylene oxide, pluronic F-127, chitosan, any salt thereof, and any combination thereof. Optionally in this embodiment or any other embodiment of the present disclosure, the at least one thermoresponsive polymer undergoes a thickening transition at a thickening transition temperature of from about 30° C. to about 210° C. Optionally in this embodiment or any other embodiment of the present disclosure, the thermally responsive hydrogel is present in the thermally responsive lost circulation material in an amount from about 50% to about 99.9% by weight of the thermally responsive lost circulation material.

Another embodiment of the present disclosure is a composition including at least one first lost circulation material, a second lost circulation material that includes a thermally responsive hydrogel including at least one thermoresponsive polymer, and a plurality of fibers, wherein the thermally responsive hydrogel is present in the composition in an amount from about 50% to about 99.9% by weight of the composition. Optionally in this embodiment or any other embodiment disclosed herein, the at least one first lost circulation material is present in composition in an amount from about 0.1% to about 50% by weight of the composition. Optionally in this embodiment or any other embodiment of the present disclosure, the at least one thermoresponsive polymer includes at least one monomer selected from the group consisting of: N-isopropylacrylamide, hydroxyethyl methacrylate, acrylamide, N,N-diethylacrylamide, N-ethylacrylamide, N-methylacrylamide, N-n-butylacrylamide, N-tert-butylacrylamide, butyl acrylate, ethyl acrylate, propyl acrylate, methacrylamide, a methacrylate, methyl vinyl ether, N-vinyl-caprolactam, polypeptides, ethylene oxide, propylene oxide, pluronic F-127, chitosan, any salt thereof, and any combination thereof. Optionally in this embodiment or any other embodiment of the present disclosure, the at least one thermoresponsive polymer undergoes a thickening transition at a thickening transition temperature of from about 30° C. to about 210° C.

Another embodiment of the present disclosure is a method including determining a composition for a treatment fluid including a thermally responsive lost circulation material based at least in part on: a spacer volume; a thickening transition temperature of the treatment fluid; a flow, a heat load and a placement of the treatment fluid; and a need for the treatment fluid to include a composite thermally responsive lost circulation material mixture; mixing the treatment fluid in a composite/spacer mixing system; determining if the treatment fluid should be chilled based at least in part on the flow, the heat load and the placement of the treatment fluid; if the treatment fluid should be chilled, chilling the treatment fluid to a temperature below an ambient temperature of the composite/spacer system; determining if a freezing point of the treatment fluid is too high based at least in part on the flow, the heat load and the placement of the treatment fluid; if the freezing point of the treatment fluid is too high, adding a freezing point inhibitor to the treatment fluid; injecting at least one spacer before or after the treatment fluid into a wellbore penetrating at least a portion of a subterranean formation including a loss zone; and introducing the treatment fluid into the wellbore, wherein the thermally responsive lost circulation material includes a thermally responsive hydrogel including at least one thermoresponsive polymer. Optionally in this embodiment or any other embodiment disclosed herein, mixing the treatment fluid in the composite/spacer mixing system further includes: introducing an amount of thermally lost circulation material supply with various thickening transition temperatures to the treatment fluid; and introducing at least one composite component to the treatment fluid. Optionally in this embodiment or any other embodiment of the present disclosure, the at least one spacer includes at least one component selected from the group consisting of: oil, brine, water, and any combination thereof. Optionally in this embodiment or any other embodiment of the present disclosure, the method further includes allowing the thermally responsive lost circulation material to reach a thickening transition temperature; and allowing the treatment fluid to at least partially set in the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a treatment fluid comprising a base fluid and a thermally responsive lost circulation material comprising a thermally responsive hydrogel that comprises at least one thermoresponsive polymer into a wellbore penetrating at least a portion of a subterranean formation including a loss zone;
   allowing the thermally responsive lost circulation material to reach a thickening transition temperature of at least about 125° C., wherein the thermally responsive hydrogel undergoes a liquid-to-solid phase change at or above the thickening transition temperature; and
   allowing the treatment fluid to at least partially solidify in the subterranean formation to form a solid thermally responsive hydrogel, wherein the solid thermally responsive hydrogel is present in the treatment fluid in an amount from about 0.01 to about 1 by volume fraction of solids of the treatment fluid, wherein the liquid-to-solid phase change is reversible resulting in the solid thermally responsive hydrogel becoming a liquid thermally responsive hydrogel below the thickening transition temperature.

2. The method of claim 1, wherein the at least one thermoresponsive polymer undergoes a thickening transition at a thickening transition temperature of from about 125° C. to about 210° C.

3. The method of claim 1, wherein the at least one thermoresponsive polymer undergoes a thickening transition at a thickening transition temperature of from about 125° C. to about 190° C.

4. The method of claim 1, wherein the at least one thermoresponsive polymer undergoes a thickening transition at a thickening transition temperature of from about 125° C. to about 150° C.

5. The method of claim 1, wherein the at least partially solidified treatment fluid at least partially plugs the loss zone.

6. The method of claim 1, wherein the thermally responsive lost circulation material is present in the treatment fluid in an amount from about 3% to about 60% by weight of the treatment fluid.

7. The method of claim 1, further comprising chilling the treatment fluid prior to introducing the treatment fluid into the wellbore.

8. The method of claim 1, wherein the thermally responsive hydrogel comprises a hydrogel selected from the group consisting of: a multipolymer interpenetrating polymeric hydrogel, a semi-interpenetrating polymer hydrogel, and any combination thereof.

9. The method of claim 1, wherein the at least one thermoresponsive polymer comprises at least one monomer selected from the group consisting of: N-isopropylacrylamide, hydroxyethyl methacrylate, acrylamide, N,N-diethylacrylamide, N-ethylacrylamide, N-methylacrylamide, N-n-butylacrylamide, N-tert-butylacrylamide, butyl acrylate, ethyl acrylate, propyl acrylate, methacrylamide, a methacrylate, methyl vinyl ether, N-vinyl-caprolactam, polypeptides, ethylene oxide, propylene oxide, pluronic F-127, chitosan, any salt thereof, and any combination thereof.

10. The method of claim 1, wherein the thermally responsive hydrogel is present in the thermally responsive lost circulation material in an amount from about 50% to about 99.9% by weight of the thermally responsive lost circulation material.

11. A method comprising:
introducing a treatment fluid comprising an aqueous base fluid and a thermally responsive lost circulation material comprising a thermally responsive hydrogel that comprises at least one thermoresponsive polymer into a wellbore penetrating at least a portion of a subterranean formation including a loss zone;
allowing the thermally responsive lost circulation material to reach a thickening transition temperature, wherein the thermally responsive hydrogel undergoes a liquid-to-solid phase change at or above the thickening transition temperature; and
allowing the treatment fluid to at least partially solidify in the subterranean formation forming a solid thermally responsive hydrogel, wherein the solid thermally responsive hydrogel is present in the treatment fluid in an amount from about 0.01 to about 1 by volume fraction of solids of the treatment fluid, wherein the liquid-to-solid phase change is reversible resulting in the solid thermally responsive hydrogel becoming a liquid thermally responsive hydrogel below the thickening transition temperature.

12. The method of claim 11, wherein the aqueous base fluid comprises at least one component selected from the group consisting of: water, salt water, brine, seawater, and any combination thereof.

13. The method of claim 11, wherein the aqueous base fluid does not comprise any oil.

14. The method of claim 11, wherein the at least partially solidified treatment fluid at least partially plugs the loss zone.

15. The method of claim 11, wherein the at least one thermoresponsive polymer comprises at least one monomer selected from the group consisting of: methyl vinyl ether, N-vinyl-caprolactam, polypeptides, pluronic F-127, chitosan, any salt thereof, and any combination thereof.

16. The method of claim 11, wherein the thermally responsive hydrogel is present in the thermally responsive lost circulation material in an amount from about 50% to about 99.9% by weight of the thermally responsive lost circulation material.

17. The method of claim 11, wherein the at least one first lost circulation material is present in the thermally responsive lost circulation material in an amount from about 0.1% to about 50% by weight of the thermally responsive lost circulation material.

18. A method comprising:
introducing a treatment fluid comprising a base fluid and a thermally responsive lost circulation material comprising a thermally responsive hydrogel that comprises at least one thermoresponsive polymer into a wellbore penetrating at least a portion of a subterranean formation including a loss zone;
allowing the thermally responsive lost circulation material to reach a thickening transition temperature, wherein the thermally responsive hydrogel undergoes an at least partially reversible thickening transition at or above the thickening transition temperature; and
allowing the treatment fluid to at least partially solidify in the subterranean formation forming a solid thermally responsive hydrogel, wherein the liquid-to-solid phase change is reversible resulting in the solid thermally responsive hydrogel becoming a liquid thermally responsive hydrogel below the thickening transition temperature.

19. The method of claim 18, further comprising allowing the thermally responsive lost circulation material to reach the thickening transition temperature at or below the thickening transition temperature, wherein the at least partially solidified treatment fluid undergoes a solid-to-liquid phase change at or below the thickening transition temperature.

20. The method of claim 18, wherein the thermally responsive hydrogel undergoes a thickening transition that is entirely reversible at or above the thickening transition temperature.

* * * * *